United States Patent
Ludwig et al.

(10) Patent No.: US 11,385,613 B2
(45) Date of Patent: Jul. 12, 2022

(54) PROCESS IMAGE WITHIN CONTROLLERS ENABLING VISIBILITY AND ACCESSIBILITY OF REAL WORLD OBJECTS

(71) Applicant: Siemens Aktiengesellschaft, Munich (DE)

(72) Inventors: Hartmut Ludwig, West Windsor, NJ (US); Thomas Gruenewald, Somerset, NJ (US); Florian Erseh, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 105 days.

(21) Appl. No.: 16/605,956

(22) PCT Filed: May 3, 2017

(86) PCT No.: PCT/US2017/030718
§ 371 (c)(1),
(2) Date: Oct. 17, 2019

(87) PCT Pub. No.: WO2018/203886
PCT Pub. Date: Nov. 8, 2018

(65) Prior Publication Data
US 2020/0050163 A1    Feb. 13, 2020

(51) Int. Cl.
*G05B 19/05*    (2006.01)
*G05B 19/042*    (2006.01)
*G05B 19/418*    (2006.01)

(52) U.S. Cl.
CPC ....... *G05B 19/0426* (2013.01); *G05B 19/056* (2013.01); *G05B 19/4185* (2013.01);
(Continued)

(58) Field of Classification Search
CPC .............. G05B 19/0426; G05B 19/056; G05B 19/41845; G05B 19/4185;
(Continued)

(56) References Cited

U.S. PATENT DOCUMENTS 5,371,895 A * 12/1994 Bristol ............... G05B 19/0426
700/86
5,980,078 A    11/1999 Krivoshein et al.
(Continued)

FOREIGN PATENT DOCUMENTS

CN    106530111 A    3/2017

OTHER PUBLICATIONS

International Search Report dated Mar. 21, 2018; International Application No. PCT/US2017/030718; Filing Date: May 3, 2017; 12 pages.
(Continued)

*Primary Examiner* — Christopher E. Everett

(57) ABSTRACT

A system for using digital twins to interact with physical objects in an automation system includes a plurality of controller devices, a process image backbone, and a registry comprising a plurality of digital twins. Each respective controller device comprises a volatile computer-readable storage medium comprising a process image area. The process image backbone provides the controllers with uniform access to the process image area of each controller. Each digital twin in the registry corresponds to a physical device controllable via one of the controllers devices via a corresponding process image area.

19 Claims, 5 Drawing Sheets

(52) U.S. Cl.
CPC ............... *G05B 19/41845* (2013.01); *G05B 2219/15009* (2013.01)

(58) Field of Classification Search
CPC .......... G05B 2219/15009; G05B 2219/24215; G05B 2219/31393; G05B 2219/32339; G05B 2219/32398; G05B 2219/32404; G05B 2219/32406; G05B 2219/40312; G05B 19/418; Y02P 90/02
See application file for complete search history.

(56) References Cited

U.S. PATENT DOCUMENTS

| | | | |
|---|---|---|---|
| 8,078,357 B1 | 12/2011 | Angerilli | |
| 8,521,359 B1* | 8/2013 | Trytten | G06F 8/20 701/36 |
| 2006/0026193 A1* | 2/2006 | Hood | G05B 19/0426 |
| 2011/0154375 A1* | 6/2011 | Helal | H04L 41/0806 719/320 |
| 2012/0079461 A1* | 3/2012 | Copass | G05B 19/41845 717/136 |
| 2012/0150352 A1 | 6/2012 | Park | |
| 2014/0282020 A1* | 9/2014 | Piper | H04L 41/22 715/735 |
| 2016/0247129 A1 | 8/2016 | Song et al. | |
| 2017/0108834 A1 | 4/2017 | Wang et al. | |
| 2018/0321662 A1* | 11/2018 | Nixon | G06F 13/364 |

OTHER PUBLICATIONS

Schroeder Greyce N. et al.: "Digital Twin Data Modeling with AutomationML and a Communication Methodology for Data Exchange"; IFAC-PAPERSONLINE; vol. 49; No. 30; Jan. 1, 2016; pp. 12-17; XP055855426; DE; ISSN: 2405-8963, DOI: 10.1016/j.ifacol.2016.11.115; URL:https://www.sciencedirect.com/science/article/pii/S2405896316325538 / 01.01.2016.

Krauss, Aaron: "Programming Concepts: Type Introspection and Reflection"; Feb. 12, 2016; pp. 1-5; XP055871135; URL :https ://thecodeboss.dev/201 6/02/prog ramming-concepts-typei ntrospection-and-reflection/ /12.02.2016.

Neto Luis et al: "Sensor SelComp, a smart component for the industrial sensor cloud of the future"; 2017 IEEE International Conference on Industrial Technology (ICIT); IEEE; Mar. 22, 2017; pp. 1256-1261; XP033091240; DOI: 10.1109/ICIT.2017.7915543 / 22.03.2017.

Examination Report dated Dec. 16, 2021; Application No. 17735680.5; 11 pages.

* cited by examiner

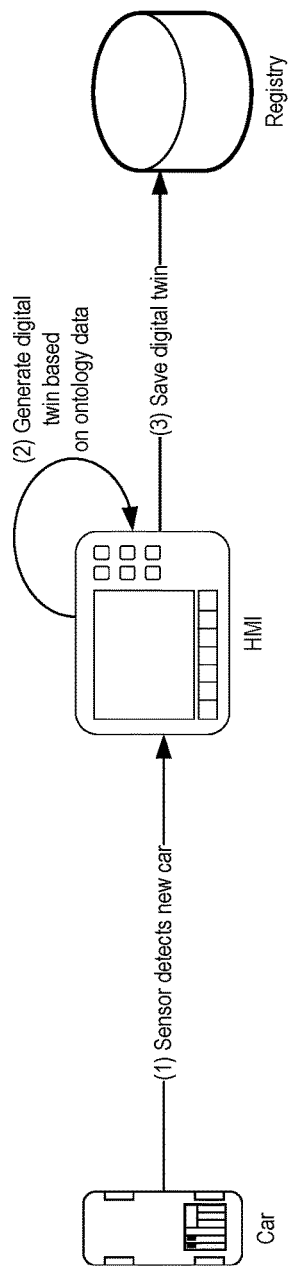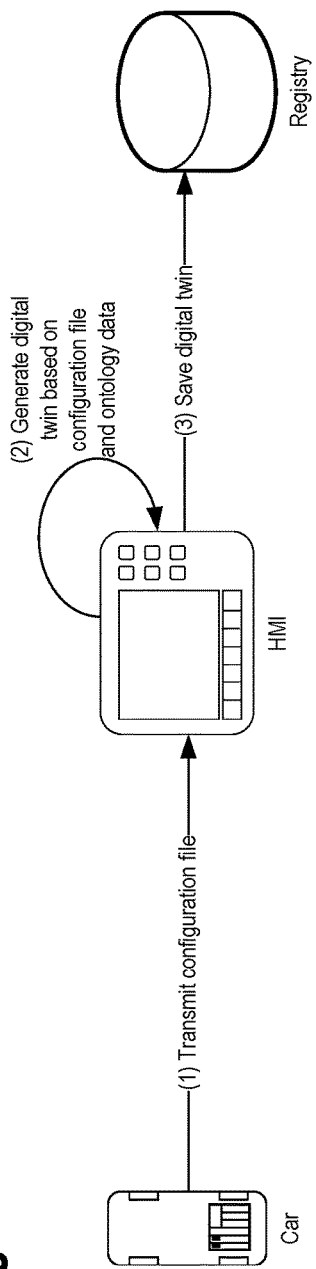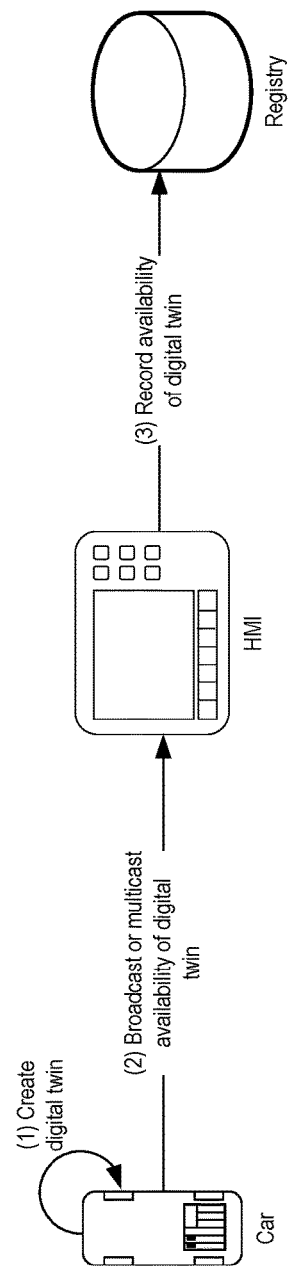

PROCESS IMAGE WITHIN CONTROLLERS ENABLING VISIBILITY AND ACCESSIBILITY OF REAL WORLD OBJECTS

CROSS REFERENCE TO RELATED APPLICATIONS

This application is a national phase filing under 35 U.S.C. § 371 of International Patent Application No. PCT/US2017/030718, filed May 3, 2017, which is incorporated herein by reference in its entirety.

TECHNICAL FIELD

The present disclosure relates generally to using process image data within controllers to access real world objects. The various systems and methods may be applied to industrial automation applications, as well as various other applications where controllers are used.

BACKGROUND

A controller is a specialized computer control system configured to execute software which continuously gathers data on the state of input devices to control the state of output devices. Examples of controllers include programmable logic controllers, motion controllers, CNC, Smart I/O and drive controllers. A controller typically includes three major components: a processor (which may include volatile memory), volatile memory comprising an application program, and one or more input/output (I/O) ports for connecting to other devices in the automation system. Modern controllers have their own process images and data historians. Additionally, these systems often have proprietary data access interfaces to facilitate cross layer (vertical) data access between automation systems. This is also true for horizontal access between control systems at the same layer.

Conventional controllers expose to programmers the object model of the controller which contains digital or analog inputs and outputs. Typically, the object model is statically configured during commissioning/engineering and cannot be changed during runtime. Real world objects/assets of the process being controlled (such as machine, equipment) are not visible or accessible via the object model. As a result controller programmers have to translate the behavior and reconstruct the state of real world objects into/from digital/analogue signals. If anything in the physical process changes, such as adding/removing, changing equipment or product typically the controller programmer has to change his program to adapt to the change. This is inefficient and takes time and often interrupts the production process.

SUMMARY

Embodiments of the present invention address and overcome one or more of the above shortcomings and drawbacks, by providing methods, systems, and apparatuses related to enabling visibility and accessibility of real world objects in controller programming environments. The technology described herein is particularly well-suited for, but not limited to, various automation applications.

According to some embodiments, a system for using digital twins to interact with physical objects in an automation system includes a plurality of controller devices, a process image backbone, and a registry comprising a plurality of digital twins. Each respective controller device comprises a volatile computer-readable storage medium comprising a process image area. The process image backbone provides the controllers with uniform access to the process image area of each controller. Each digital twin in the registry corresponds to a physical device controllable via one of the controllers devices via a corresponding process image area.

In some embodiments, digital twin is an object instantiated from an object oriented class. For example, in one embodiment, each object oriented class comprises function calls which utilize the process image backbone to interact with the process image area of at least one controller.

In other embodiments, the aforementioned system includes a computing device that is configured to create each digital twin in the registry in response to detecting an addition of the physical device into the automation system. This computing device may be, for example, a human-machine interface (HMI) device and may store the registry in a local or distributed database. In one embodiment, the computing device detects the addition of the physical device based on a message transmitted from a corresponding controller device. For example, in one embodiment, this corresponding controller device is coupled to sensors and the message is transmitted to the computing device in response to activation of the sensors.

According to another aspect of the present invention, a computer-implemented method for using digital twins to interact with physical objects in an automation system includes a computing device receiving a request to modify a state of a physical device in the automation system and retrieving a digital twin corresponding to the physical device from a registry. The computing device determines a function implemented by the digital twin that corresponds to the state in the request. This function is implemented using process image data stored on a controller coupled to the physical device. Additionally, in some embodiments, the function utilizes a process image backbone to interact with the process image data stored on the controller. The computing device calls the function using the digital twin.

Some embodiments of the aforementioned method further include deriving one or more function arguments based on the request to modify the state of the physical device. For example, in one embodiment, the function arguments are derived by parsing the request using a natural language processing model. In some embodiments, the function is implemented on the controller and the function is called by the computing device using a remote procedure call to the controller.

According to other embodiments of the present invention, a computer-implemented method for using digital twins to interact with physical objects in an automation system includes receiving an indication that a new physical device was added to the automation system. This indication may be, for example, a sensor activation message which indicates that a particular sensor was activated. In response to the received indication, type information and one or more properties related to the new physical device are determined using an ontology of physical devices related to the automation system. A digital twin may then be generated based on the type information and the properties. Once generated, the digital twin may be stored in a repository with information describing relationships of new physical device and other physical devices in the automation system. This relationship information may be generated, for example, using the aforementioned ontology of physical devices related to the automation system.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 3A shows a way in which the registry can be populated with a new digital twin as introduced into the system, according to some embodiments;

FIG. 3B shows a second way in which the registry can be populated with a new digital twin as introduced into the system, according to some embodiments.

FIG. 3C shows how digital twin as introduced into the system using a process image backbone (PIB), according to some embodiments;

DETAILED DESCRIPTION

Systems, methods, and apparatuses are described herein which relate generally to enabling visibility and accessibility of real world objects in controller programming environments. Briefly, a digital twin is a digital version of a physical component of a system (e.g., a door of a train). The digital twin provides an abstraction of low-level functionality corresponding to the physical component. Additionally, the digital twin may mirror the status of the machine and/or the overall physical system. For example, sensors may be placed on the machine to capture real-time (or near real-time) data from the physical object to relay it back to the digital twin. The digital twin can then make any changes necessary to maintain its correspondence to the physical component.

Figure 1:
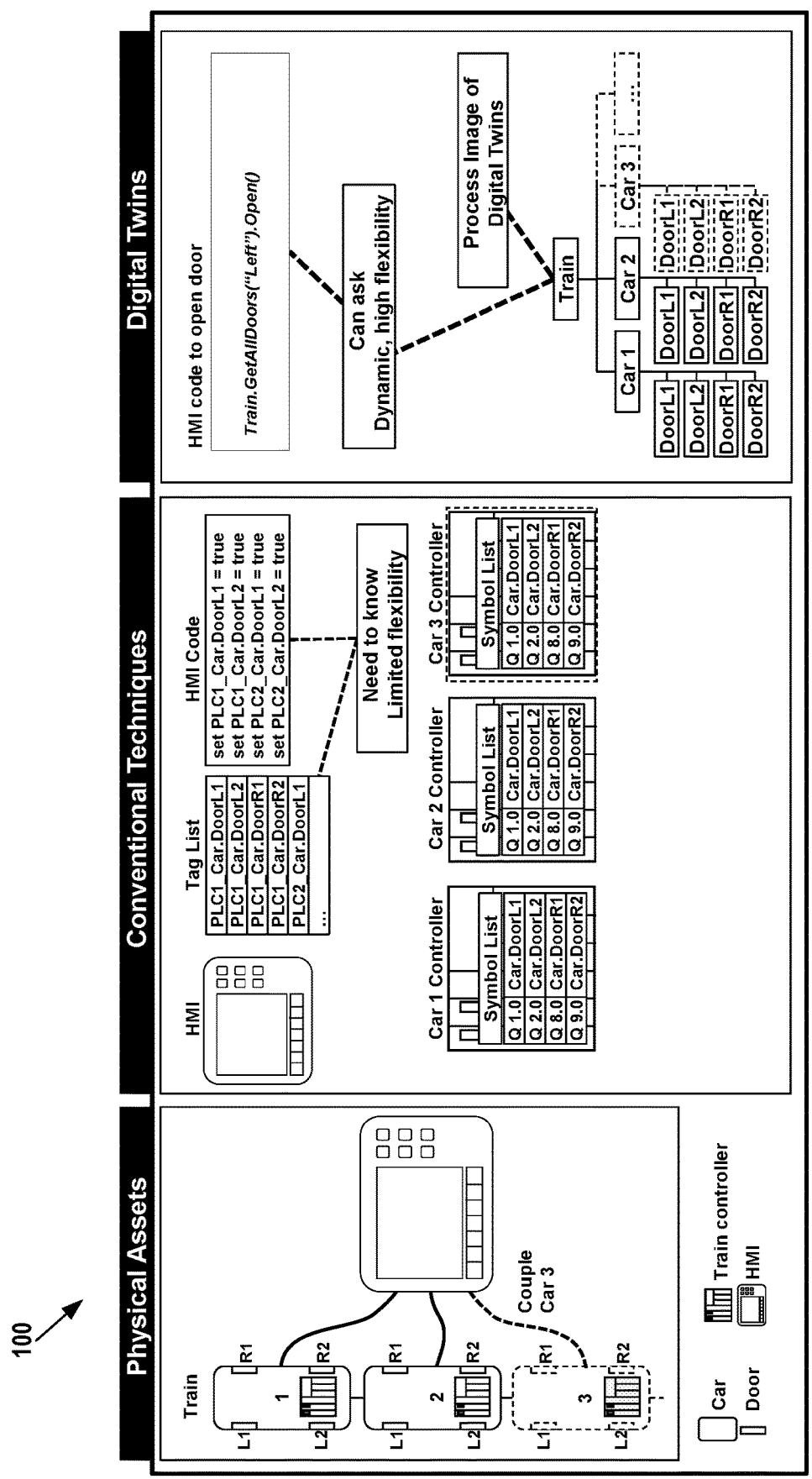
FIG. 1 provides a conceptual view of how a train car system can be modeled using conventional techniques and the digital twins techniques described herein.

FIG. 1 provides a conceptual view 100 of how a train car system can be modeled using conventional techniques and the digital twins techniques described herein. On the left-hand side of FIG. 1, under the label "Physical Assets," the physical components of the train system are illustrated. Here, there are two train cars (labeled "1" and "2"). Each car includes four doors: two doors on the left side of the car, and two doors on the right side. Additionally, each car includes a train controller. These train controllers are connected, via a wired or wireless communication medium, to a human-machine interface (HMI) which allows configuration of the cars as well as other interactions (e.g., opening and closing the doors). It should be noted that, although an HMI is shown for illustration in FIG. 1, various alternative computing devices may be used for communication with the train controllers in each car. The Physical Assets section of FIG. 1 also shows a third car (labeled "3") being coupled to the train. In this case, the train controller on the new car communicates with the HMI to register the car as an additional component of the train system.

The middle section of FIG. 1, labeled "Conventional Techniques" shows how train system data is managed in a conventional system. This section illustrates the data that needs to be maintained just to interact with the doors of each train car. As shown each controller includes a symbol list which comprises a symbol for each door. Thus, within each controller the symbols "Car.DoorL1" and "Car.DoorL2" refer to the two doors on the left side of the car, while "Car.DoorR1" and "Car.DoorR2" refer to the two doors on the right side of the car, respectively. In order for the HMI to interact with these doors, it must maintain a tag list (e.g., PLC1_Car.DoorL1, PLC1_Car.DoorL2, etc.). Additionally, in order to interact with each door, the HMI must be coded to explicitly refer to these tags. Thus, as shown in the code snippets labeled "HMI Code" in FIG. 1, to open all doors on the left side of the train, the HMI code must explicitly set each tag corresponding to the left side doors to "true." Thus, conventional techniques are deficient in at least two regards. First, there is a need to know each and every available tag in the system in order to interact with physical components. Secondly, because everything is coded explicitly, the HMI code has limited flexibility to adapt to changes in the real world system.

The right hand section of FIG. 1, labeled "Digital Twins" shows how the train system can be modeled using the digital twins technique discussed herein. Digital twins provide a layer of abstraction over a digital twin that allows interactions with real world devices. Here, the train is represented as a digital twin that is an aggregate of car digital twins. This allows the complexity of basic function requests to be greatly reduced through abstraction. Thus, as shown in the HMI code at the top of the section, a single function call may be made to the train digital twin to open all doors on the left hand side. In turn, the train digital twin can execute a function call to each car to open their doors. This abstraction can be further extended to lower level details of the physical objects. For example, each door itself can be a digital twin that is called by the car digital twin with a request to open or close.

Each digital twin uses data stored in the process image of the controller. Various techniques may be used for linking the digital twin instance to the process image data. For example, in some embodiments, the digital twin is an object instantiated from an object oriented class. The functions within the class can be coded such that they get or set process image data as needed when the function is called. For example, the "Open( )" function shown in FIG. 1 may be implemented by determining the controller for a particular train car and manipulating the process image data of that controller. In some embodiments, this manipulation takes place using a Process Image Backbone (PIB), described below with respect to FIG. 4. It should be noted that an instantiated object is only one example of how the abstraction of the digital twin can be implemented. In other embodiments, other programming structures and techniques generally known in the art may be applied (e.g., data structures, modules, etc.) to provide the same functionality.

Figure 2:
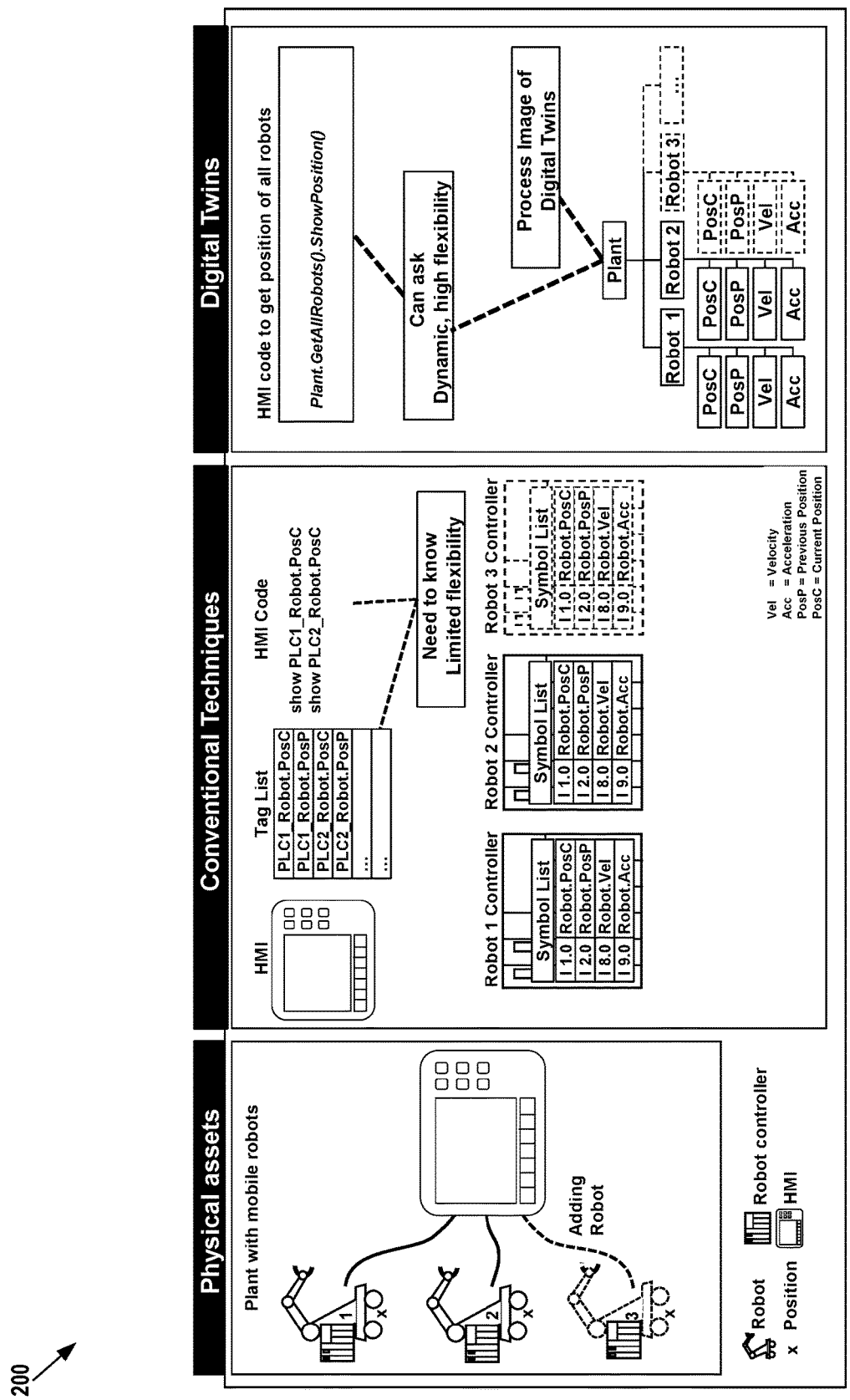
FIG. 2 provides a conceptual view of how an automation system with robots can be modeled using conventional techniques and the digital twins techniques described herein.

The general concept shown in FIG. 1 can be extended to other applications. For example, FIG. 2 shows a conceptual view 200 of an alternative system where the physical assets are mobile robots. As shown in the "Conventional Techniques" section, the symbol list, tag list, and HMI code required to manage position, velocity, and acceleration are similar to the data required to manage the train door state shown in FIG. 1. The Digital Twins section of FIG. 2 illustrates how the HMI code for addressing all robots can be simplified to a single function call. Here, there is a digital twin for the entire plan in which the robots operate. This digital twin offers a function call "GetAllRobots( )" that returns a list of the digital twins for each robot in the physical plant. Then, the ShowPosition( ) function call iterates over each robot digital twin in the list and issues a ShowPosition( ) request. Note that this abstraction allows new robots to be added to the plant without additional recording of the HMI. For example, the "Physical Assets" section shows a new robot (labeled "3") added to the plant. In this case, the underlying registry of the plant (discussed below) will be updated accordingly such that when the "GetAllRobots( )" is next executed, it will return the new robot in the list.

In order to be used effectively, it is important that the relationship between digital twins is known and accessible during execution. Additionally, the use of digital twins is dynamic in nature and digital twins may be created and destroyed as a particular process executes and things change in the physical world. For both of these reasons, some relationship structure between the digital twins may be created and modified as necessary during execution. In some embodiments, the relationships are maintained in a registry that specifies the types, properties, and interrelationships of the digital twins. This registry may be a database or other collection of data. The registry may be stored on the HMI or any other computer accessible to the controllers. In some embodiments, the registry is a distributed database stored across all of the computing devices (including the controllers) present in the system.

In some embodiments, registry may be implemented using type introspection and/or reflection programming techniques generally known in the art. Type introspection allows code to examine a programming object at runtime. Thus, with the train example, the registry may maintain address information for a collection of objects representing the digital twins of the physical assets. Type introspection may be used as new objects introduced, for example, by checking a new object's type against a series of known object types until a match is found. If a match is not found, the object may be designated as unknown. This allows objects to be classified (e.g., all robots) so that objects can be later accessed and used. Reflection techniques provide introspection, but also allow the objects to be manipulated at runtime via function calls or changes to the object's attributes. In this way, the system code can be implemented using a generic interface and the classes used to support each digital twin can be instantiated via reflection using configuration files. In some embodiments, each controller may maintain its own configuration files or, in other embodiments, a master configuration file may be used that includes class definitions for all objects in the system. The former strategy provides more overall flexibility because new object types can be introduced as needed, while the latter strategy offers greater stability because the range of possible objects is centralized.

FIG. 3A shows one way in which the registry can be populated with a new digital twin as introduced into the system, according to some embodiments. Here, as the car is coupled to the other cars in the system, a sensor detects the coupling and transmits a message to an HMI indicating that a new car has been connected. Alternatively, the controller of the new car may broadcast a message across the network connecting the computing devices included in the system. Based on this message, the HMI detects the new car. Once the new car is detected, the HMI creates a new digital twin instance based on predetermined ontology data which describes the system. This ontology may be specified, for example, in a standard ontology language (e.g., RDF, Web Ontology Language (OWL) as standardized by W3C) and specify the types, properties, and interrelationships of physical assets that may be included in the system. Thus, to continue with the example of FIG. 3A, the HMI will create a new "train car" digital twin with properties (e.g., number of doors) set based on the ontology. The relationship of the new digital twin to existing digital twins may be based on the initial sensor message and/or other messages received from the physical assets. For example, the initial sensor message received may include which train car(s) the new train car is being coupled to. Alternatively, multiple sensor messages may be received and used to determine the interrelationship between physical assets. Once the digital twin is created, it is entered into the registry.

FIG. 3B shows an alternative way in which the registry can be populated with a new digital twin as introduced into the system, according to some embodiments. Here, the controller of the train car sends a configuration file which describes its physical assets. For example, the configuration file may include an ontology which describes the new physical asset. To continue with the train example, the configuration file comprise the attributes "is-a train car," "contains doors," and "open" and "close" functions may be applied to each door. Based on the configuration file and the other ontology data describing the system, the HMI generates a digital twin and saves it in the registry.

FIG. 3C shows a third way in which the registry can be populated with a new digital twin as introduced into the system, according to some embodiments. Here, the digital twin is created and stored locally on the train car's controller. The availability of the digital twin is communicated to the HMI, for example, via a broadcast or multicast message. The HMI then records the availability of the digital twin in the registry. It should be noted that the registry in this case is much more simplified that in the examples shown in FIGS. 3A and 3B. In FIG. 3C, the registry only needs to record basic information indicating that a train car digital twin is available and can be communicated with via a particular device or a particular address on the network.

The digital twin is effectively an abstraction of data available via the process image of each controller. Any updates to the state of the physical asset and all interaction with the physical asset are performed through the process image. Thus, efficient communication with the process image of each controller is important to the overall efficiency of the system. In some embodiments, the process image data corresponding to each digital twin is accessed via a PIB.

Figure 4:
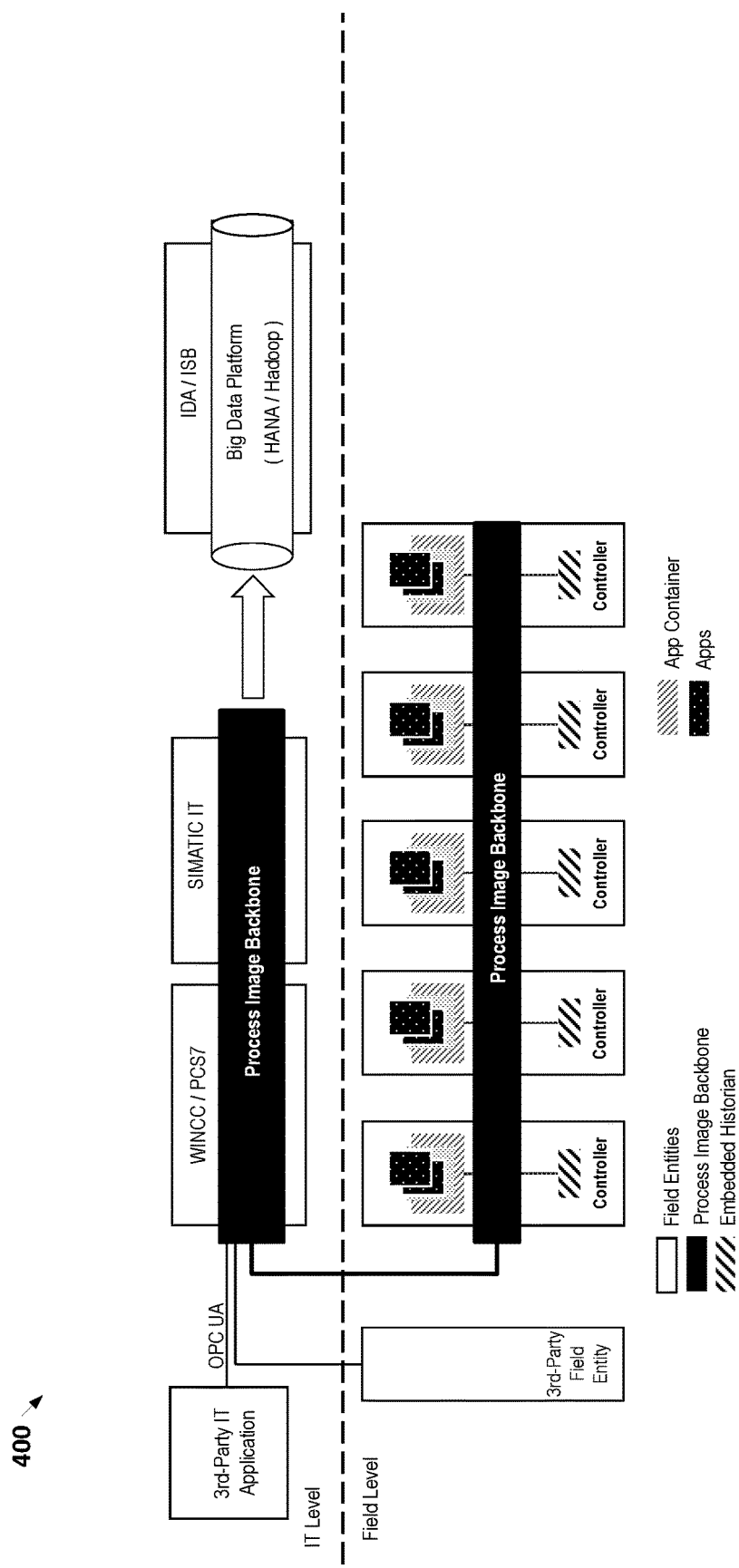
FIG. 4 provides an architecture diagram illustrating an automation system where field entities and other automation devices are connected by a PIB.

FIG. 4 provides an architecture diagram illustrating an automation system 400 where field entities and other automation devices are connected by a PIB. The PIB unifies the data access from different devices or different runtimes and serves as the medium for decoupled interactions between the different runtimes, hence the term "backbone." The PIB supplements the capabilities available via systems such as OLE for Process Control (OPC) Unified Architecture (UA). For example, in OPC UA you still need configuration; with the PIB the data is just available and semantically described so it can be used.

In the PIB, a process image or data historian is integrated into the common process image instead of into the local process image of the individual runtime. A PIB provides interfaces to browse all digital twins, as well as other data, available across all nodes of the automation system 400. Each application has to access the local access point of the process image backbone. The PIB is responsible for mapping to a local process image or historian or a remote process image or historian.

In the example of FIG. 4, five controllers are shown. Each controller includes one or more software applications (or "apps") executing in an app container. It should be noted that the use of apps in this case is entirely optional for implementation of universal data access via the PIB. Thus, an architecture similar to FIG. 4 can be implemented with more traditional controllers that do not offer app functionality.

Continuing with reference to FIG. 4, each controller also includes an embedded historian which stores data generated in the app environment and a process image (not shown in FIG. 4) which stores inputs, outputs, etc. of the apps as they are executed. The process image backbone is effectively a common process image that serves as the medium for decoupled interactions between the different runtimes of the field entities. Structurally, each controller maintains its local process image locally along with an instance of software for communicating in real-time or near-real time with other field entities. In some embodiments, the data accessible over the process image backbone is limited to the data present in the process image of each device at any given time. However, in other embodiments, the process image backbone can also be used to access the embedded historian of each device. Thus, windows of time series data can be accessed via the process image backbone.

Continuing with the example of FIG. 4, the process image backbone is implemented across IT level devices such as a supervisory control and data acquisition (SCADA) and human-machine interface (HMI) systems (e.g., WINCC/PCS7 and SIMATIC IT in FIG. 4). By connecting with these IT level devices, $3^{rd}$ party field entities can indirectly access the process image backbone. Thus, for example, existing field entities do not necessarily require significant changes to their control programs or architecture to support process image backbone access; rather, the existing field entities can just receive this data in the manner that other IT level data is received. Implementation of the process image backbone at the IT level also allows $3^{rd}$-Party IT Applications to access process image backbone data. Thus, in some embodiments, desktop or mobile apps can be created to access the backbone and view windows of process image data. These apps can communicate with the IT level devices using protocols such as TCP, Open Database Connectivity (ODBC), and/or OPC UA, using a local intranet (e.g., implemented via Ethernet) and/or one or more internets.

The system shown in FIG. 4 also provides accessibility of the process image backbone at the IT level which, in turn, facilitates processing of process image data by big data platforms such as HANA/Hadoop. This may be used, for example, to perform analytics on automation system operations in a parallel computing environment (e.g., NVIDIA CUDA©) using processing resources not available at the field level.

Additional information on the PIB may be found in PCT Patent Application No. PCT/US17/23565, filed Mar. 22, 2017 and entitled "Universal Data Access Across Devices," the entirety of which is incorporated herein by reference.

Figure 5:
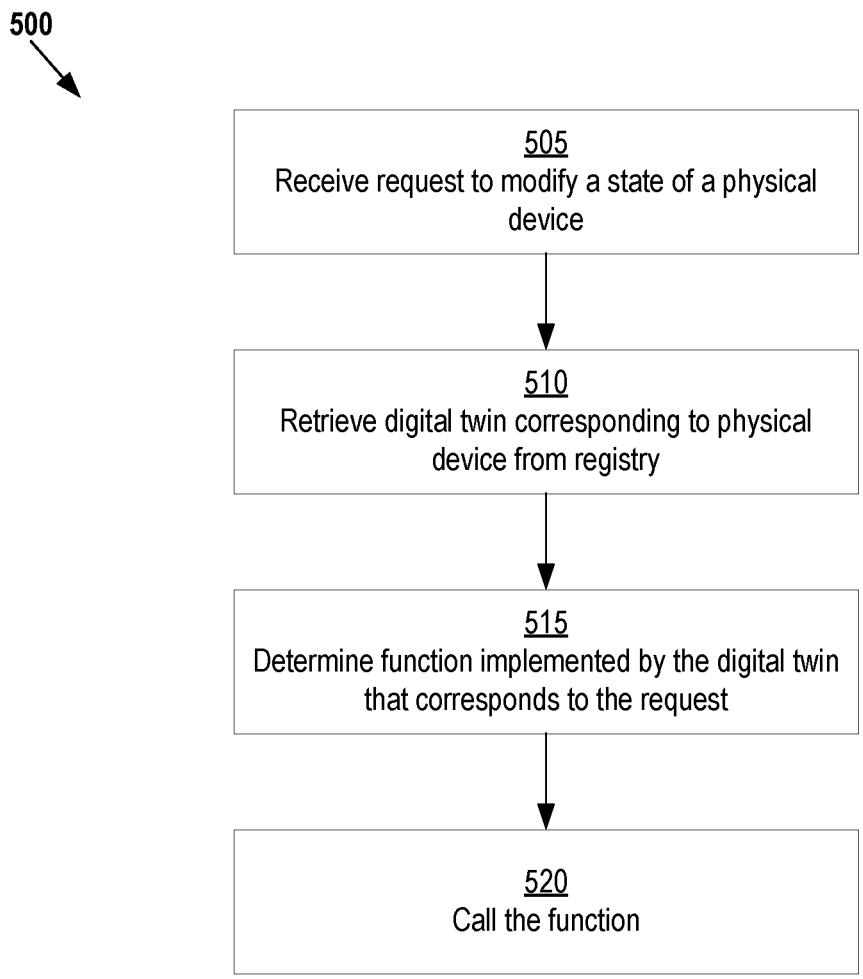
FIG. 5 illustrates an example of a method for using digital twins to interact with physical objects in an automation system, according to some embodiments

FIG. 5 illustrates an example of a method 500 for using digital twins to interact with physical objects in an automation system, according to some embodiments. At step 505, a computing device (e.g., an HMI) receives a request to modify a state of a physical device in the automation system.

The physical device's "state" can include generally any characteristic of the physical device that changes during operations. In some embodiments, the request can be received directly from a user, for example, input via text or voice into the HMI. In other embodiments, the request is generated during execution of a control application or other program executing within the automation system. For example, a train controller may include the instruction "Train.GetAllDoors("Left").Open( )" which is executed during normal processing in response to determining that a particular button was activated in the train's user interface.

Next, at step 510, the computing device retrieves a digital twin corresponding to the physical device from a registry. In some embodiments, the digital twin is an object instantiated from an object oriented class. At step 515, the computing device determines a function implemented by the digital twin that corresponds to the state in the request. As noted above, the function is implemented using process image data stored on a controller coupled to the physical device. In some embodiments, the computing device will also derive one or more function arguments based on the request to modify the state of the physical device.

In some instances, these function arguments may be extracted directly from the request. For example, the request may state that a physical object should be moved to a particular location specified by coordinates that can be directly passed to the function. Alternatively, a natural language processing model may be used to parse the request and determine the arguments. In some embodiments, the function itself can also be determined with natural language learning. Natural language processing models are known in the art and, thus, are not described here in detail. In some embodiments, the natural language processing model is a machine learning model trained on the available functions provided by the digital twins and common way of describing those function. As an example of how this may be applied, consider a request stating "open all doors on the left side of the train." The natural language processing model may process the text of this request and formulate the function call "Train.GetAllDoors("Left").Open( )".

Then, at step 520 of FIG. 5, the computing device calls the function using the digital twin. In some embodiments, the function utilizes a process image backbone to interact with the process image data stored on the controller (see FIG. 4) or applications executing on each controller. In some embodiments, the function is implemented on the controller and the function is called by the computing device using a remote procedure call to the controller or using a technique such as remote method invocation (RMI).

The processors described herein as used by embedded controllers may include one or more central processing units (CPUs), graphical processing units (GPUs), or any other processor known in the art. More generally, a processor as used herein is a device for executing machine-readable instructions stored on a computer readable medium, for performing tasks and may comprise hardware, firmware, or any combination thereof. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the embedded controllers and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. An automation system comprising:
 a plurality of digital twins, each digital twin being a digital version of a corresponding physical device of a plurality of physical devices within the automation system;
 a plurality of controller devices, wherein each controller device of the plurality of controller devices comprises a volatile computer-readable storage medium comprising a local process image area for controlling one or more physical devices of the plurality of physical devices;
 a process image backbone connected to the plurality of controller devices and providing applications within the automation system with uniform access to the local process image area of each controller device so as to define a common process image that provides access to each digital twin by each application of the applications at respective runtimes associated with the applications that are decoupled from each other; and
 a registry comprising the plurality of digital twins, wherein each digital twin corresponds to a respective physical device of the plurality of physical devices controllable via a select one of the controller devices via the local process image area of the select controller device.

2. The system of claim 1, wherein each digital twin of the plurality of digital twins is an object instantiated from an object oriented class.

3. The system of claim 2, wherein each object oriented class comprises function calls which utilize the process image backbone to interact with the local process image area of at least one controller.

4. The system of claim 1, comprising a computing device configured to create each digital twin in the registry in response to detecting an addition of the physical device into the automation system.

5. The system of claim 4, wherein the computing device is a human-machine interface (HMI) device.

6. The system of claim 4, where the computing device detects the addition of the physical device based on a message transmitted from a corresponding controller device.

7. The system of claim 6, wherein the corresponding controller device is coupled to one or more sensors and the message is transmitted to the computing device in response to activation of the one or more sensors.

8. The system of claim 4, wherein the registry is stored as a database in the computing device.

9. The system of claim 1, wherein the registry is stored as a distributed database across the plurality of controller devices.

10. A computer-implemented method for using a plurality of digital twins to interact with a plurality of physical devices in an automation system, each digital twin of the plurality of digital twins being a digital version of a corresponding physical device of the plurality of physical devices, the method comprising:

receiving, by a computing device, a request to modify a state of a first physical device of the plurality of physical devices in the automation system;

retrieving, by the computing device, a first digital twin of the plurality of digital twins corresponding to the first physical device from a registry;

determining, by the computing device, a function implemented by the first digital twin that corresponds to the state in the request, wherein the function is implemented using local process image data stored on a first controller device of a plurality of controller devices, the first controller device coupled to the first physical device such that the local process image data stored on the first controller device defines data for controlling the first physical device;

calling, by the computing device, the function using the first digital twin; and a plurality of applications within the automation system accessing, via a process image backbone connected to the plurality of controller devices, the local process image data of each controller device of the plurality of controller devices so as to define a common process image that provides access to each digital twin of the plurality of digital twins by each application of the plurality of applications at respective runtimes associated with the plurality of applications that are decoupled from each other.

11. The method of claim 10, wherein the function utilizes the process image backbone to interact with the local process image data stored on each of the plurality of controller devices.

12. The method of claim 10, further comprising:
deriving one or more function arguments based on the request to modify the state of the first physical device, wherein the function is called with the one or more function arguments.

13. The method of claim 12, wherein the one or more function arguments are derived by parsing the request using a natural language processing model.

14. The method of claim 10, wherein the first digital twin is an object instantiated from an object oriented class.

15. The method of claim 10, wherein the function is implemented on the first controller device and the function is called by the computing device using a remote procedure call to the controller.

16. A computer-implemented method for using a plurality of digital twins to interact with physical objects in an automation system, each digital twin of the plurality of digital twins being a digital version of a corresponding physical device, the method comprising:

receiving an indication that a new physical device was added to the automation system; determining type information and one or more properties related to the new physical device using an ontology of physical devices related to the automation system;

generating a first digital twin based on the type information and the one or more properties;

storing the first digital twin in a repository with information describing relationships of the new physical device and other physical devices in the automation system, wherein the first digital twin implements one or more functions using local process image data, stored on a controller coupled to the new physical device; and a plurality of applications within the automation system accessing, via a process image backbone connected to a plurality of controller devices, the local process image data of each controller device of the plurality of controller devices so as to define a common process image area that provides access to each digital twin of the plurality of digital twins by each application of the plurality of applications at respective runtimes associated with the plurality of applications that are decoupled from each other.

17. The method of claim 16, wherein the first digital twin is an object instantiated from an object oriented class.

18. The method of claim 16, wherein the indication that the new physical device was added to the automation system is a sensor activation message.

19. The method of claim 16, further comprising:
determining the information describing relationships of new physical devices and the other physical devices in the automation system using the ontology of physical devices related to the automation system.

* * * * *